United States Patent
Seok

(10) Patent No.: US 6,625,473 B1
(45) Date of Patent: Sep. 23, 2003

(54) METHOD OF SHARING LOAD IN MOBILE SWITCHING SYSTEM

(75) Inventor: Dae-Yoel Seok, Songnam-shi (KR)

(73) Assignee: Samsung Electronics Co. Ltd., Suwon (KR)

( * ) Notice: Subject to any disclaimer, the term of this patent is extended or adjusted under 35 U.S.C. 154(b) by 460 days.

(21) Appl. No.: 09/615,612

(22) Filed: Jul. 14, 2000

(30) Foreign Application Priority Data

Jul. 14, 1999 (KR) .......................................... 1999-28560

(51) Int. Cl.[7] .................................................. H04B 1/38
(52) U.S. Cl. ...................................... 455/560; 455/445
(58) Field of Search ............................... 455/560, 433, 455/507, 445; 370/351, 352, 310

(56) References Cited

U.S. PATENT DOCUMENTS

| | | | | |
|---|---|---|---|---|
| 5,396,543 A | * | 3/1995 | Beeson et al. ................. | 379/59 |
| 5,708,657 A | | 1/1998 | Hong et al. .................. | 370/335 |
| 5,724,610 A | | 3/1998 | Han et al. .................... | 395/842 |
| 6,181,933 B1 | * | 1/2001 | Jeong .......................... | 455/560 |

FOREIGN PATENT DOCUMENTS

| | | |
|---|---|---|
| DE | 4427832 A1 | 2/1996 |
| EP | 0544447 A2 | 6/1993 |
| EP | 0991285 A2 | 4/2000 |

* cited by examiner

Primary Examiner—Lee Nguyen
(74) Attorney, Agent, or Firm—Cha & Reiter

(57) ABSTRACT

Disclosed is a method of sharing a load and processing a half call in a mobile switching center which includes the steps of: processing a calling party's half call to designate a high-ranked processor determined by the call distinct code of a request message received from a predetermined base station controller; transmitting a call request message with the call distinct code to the designated high-ranked processor; processing a called party's half call to designate a high-ranked processor corresponding to a call distinct code when a paging request message is transmitted to a predetermined base station controller; and, upon receiving a paging request response message from the base station controller responsive to the paging request message, transmitting the paging request response message with the call distinct code to the designated high-ranked processor.

8 Claims, 8 Drawing Sheets

FIG. 2 [Prior Art]

METHOD OF SHARING LOAD IN MOBILE SWITCHING SYSTEM

CLAIM OF PRIORITY

This application makes reference to and claims all benefits accruing under 35 U.S.C. Section 119 from an application for METHOD OF SHARING LOAD IN MOBILE SWITCHING SYSTEM filed earlier in the Korean Industrial Property Office on Jul. 14, 1999 and there duly assigned Serial No. 28560/1999.

BACKGROUND OF THE INVENTION

1. Field of the Invention

The present invention relates to a call processing method for a mobile switching system (MSC), and more particularly to a method for sharing and processing a load generated in the MSC between originating and terminating call halves.

2. Description of the Related Art

Generally, a mobile switching system (hereinafter, referred to as "MSC") is a switching system for providing a communication service to a mobile station (MS). The MSC mainly functions as an exchange for switching a mobile station to another mobile station, or a mobile station to a cable network, as illustrated in FIG. 1.

FIG. 2 is a schematic block diagram illustrating the construction of a conventional mobile switching center (MSC). As shown in FIG. 2, the software portion is combined with the hardware portion. In such conventional MSC, the hardware and the software are combined as one protocol. As the hardware of the MSC is operatively coupled to a base station (BS), the controlling load of the MSC has been carried out by a load sharing algorithm software installed therein.

A recent development of the telecommunication industry demands an MSC to handle more complex tasks, such as the transmission request of data, image information, and video information. An improved MSC has been developed to perform more complex tasks, known as a "Next Generation MSC." However, the next MSC separates the hardware section linked to a base station and the software section controlling the hardware. As a result, there is a need for a new way to control the heavy loads among a plurality of independent workstations representing the software section and to handle the calls generated by different mobile stations.

SUMMARY OF THE INVENTION

Therefore, the present invention has been made in an effort to solve the problems occurring in the prior art, and an object of the present invention is to provide a method of sharing the load between originating and terminating call halves in real time when a call is generated by a mobile station.

It is another object of the invention to provide a method, which allows the same high-ranked processor of the MSC to perform the processing protocol between originating and terminating call halves.

It is another object of the invention to provide a method of designating a high-ranked processor when a paging request message and a paging request response message is exchanged between the MSC and BSC.

BRIEF DESCRIPTION OF THE DRAWINGS

The foregoing and other objects, features, and advantages of the present invention will become more apparent from the following detailed description when taken in conjunction with the accompanying drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
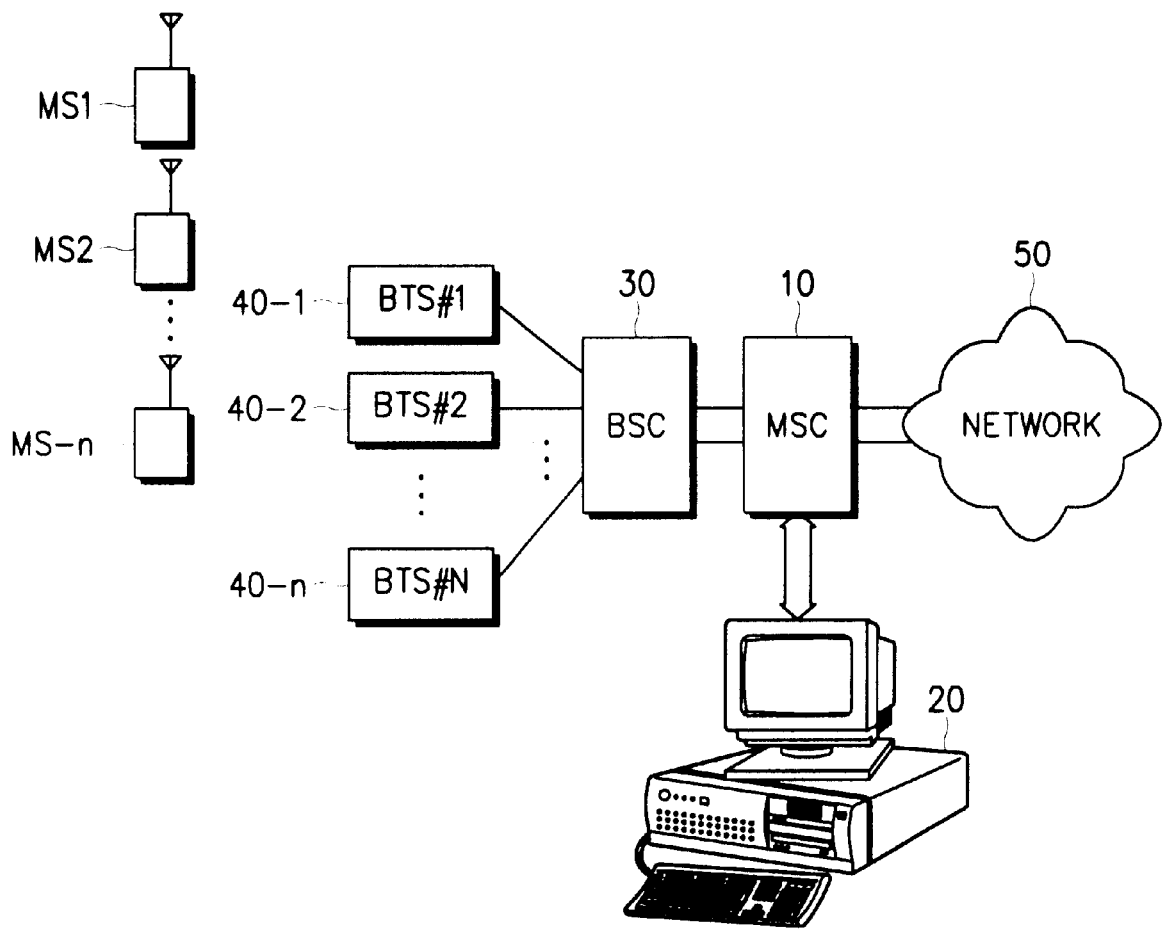
FIG. 1 is a schematic block diagram illustrating the construction of a typical mobile telecommunication system.
Figure 2:
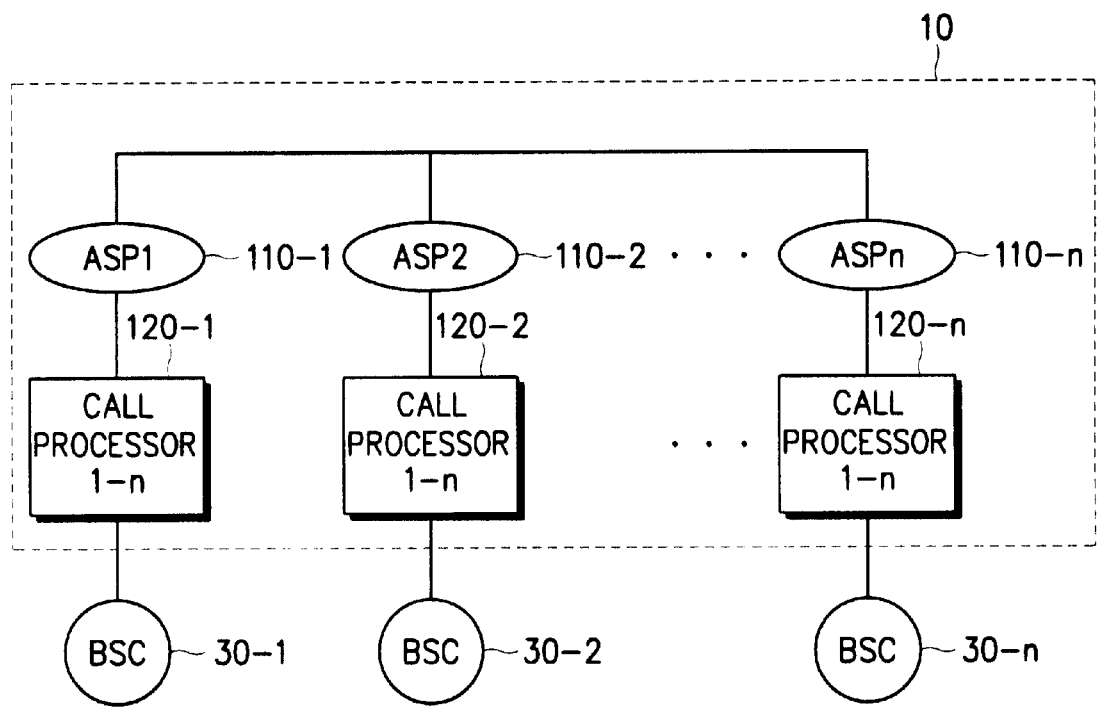
FIG. 2 is a schematic block diagram illustrating the basic construction of a conventional mobile switching center (MSC)

FIG. 1 is a schematic block diagram illustrating the construction of a typical mobile telecommunication system to which the present invention is applicable. The mobile telecommunication system is divided into a cable network 50 and a mobile station section. A mobile switching center (MSC) 10 is disposed between the cable network 50 and the mobile station section. The mobile station section includes a Base Station Controller (hereinafter, referred to as "BSC") 30, a plurality of Base Transceiver Stations #1 40-1, . . . , #n 40-n (hereinafter, referred to as "BTS 40"), and a plurality of Mobile Stations 1, . . . , n (hereinafter, referred to as "MS"). Although the BSC 30 is configured as one element in the drawing, it can include additional BSCs, as understood by those skilled in the art. The BTS 40 defines a cell site and performs the registration of the MS positioned in the cell site to provide a service to the registered MS. The BSC 30 and MSC 10 exchange an associated control signal therebetween for a call processing and call controlling purpose. The MSC 10 is connected to a high-ranked processor 20 for performing control operation for the call processing and for exchanging messages for the call processing. The high-ranked processor 20 can be implemented by a work-station, and the communication protocol between the MSC 10 and the high-ranked processor 20 can be implemented by an RS-422.

Figure 4:
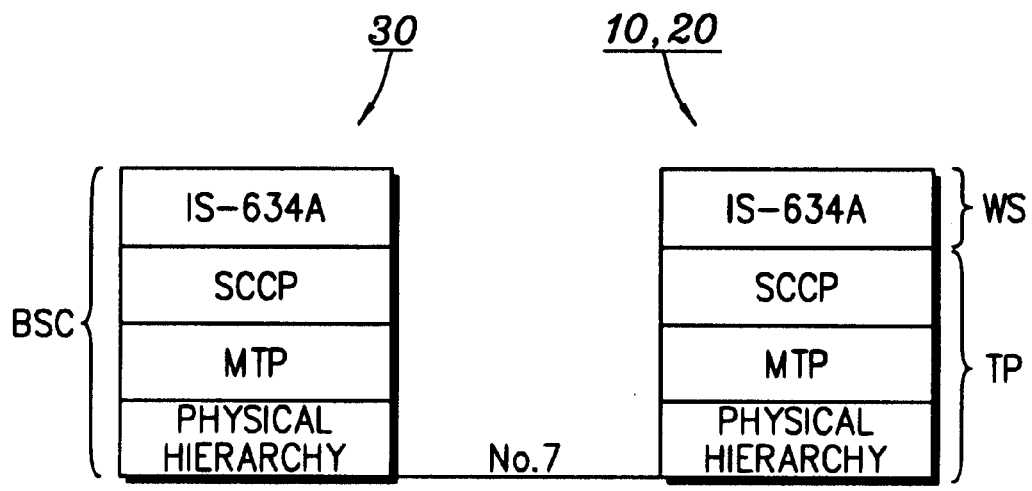
FIG. 4 is a schematic view illustrating the construction of the protocol of a mobile telecommunication system according to the embodiment of the present invention.

Further, the BSC 30, the MSC 10, and the high-ranked processor 20 are implemented by the communication protocol, as shown in FIG. 4. The BSC 30 is composed of IS-634A, SCCP (signaling connection control part), MTP (message transfer protocol), and a physical hierarchy. The MSC 10 is composed of SCCP, MTP, and a physical hierarchy in such a manner that IS-634A of the high-ranked processor 20 is placed just over the SCCP.

Figure 3:
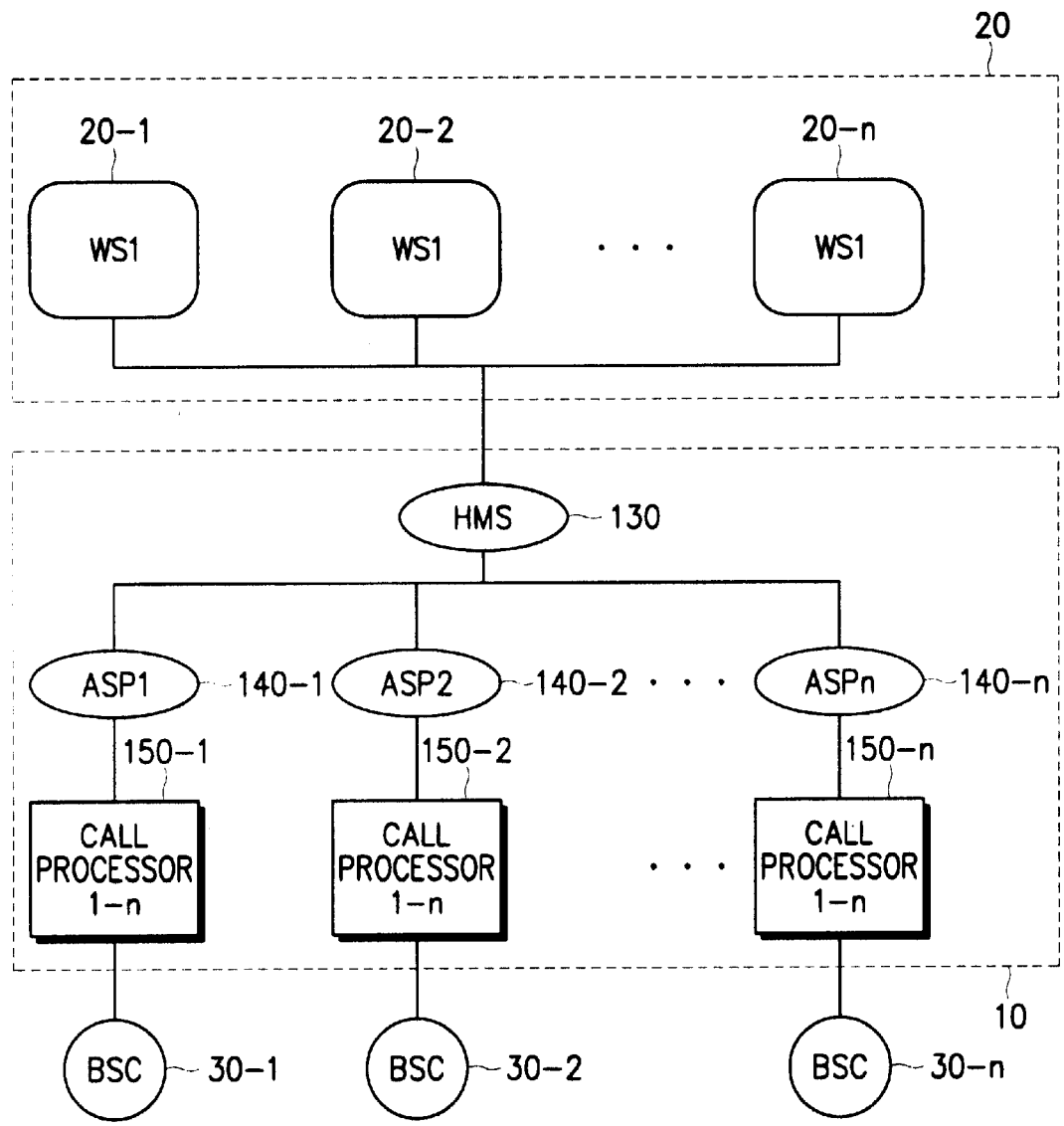
FIG. 3 is a schematic block diagram illustrating the basic construction of the next generation mobile switching center (MSC) according to the embodiment of the present invention.

FIG. 3 is a schematic block diagram according to the embodiment of the present invention and illustrates the basic construction of the next generation mobile switching center (MSC) applied to the construction of the typical mobile telecommunication system shown in FIG. 1 in accordance with the embodiment of the present invention.

With reference to FIG. 3, the next generation MSC according to the present invention is designed to have a hardware portion linked to the base station (BS) and a software portion for controlling the hardware to execute various services. The purpose of having a separate partition is to prevent the software portion from being affected by any modification done on the hardware portion. Similarly, if there is any modification on the software portion in the future, such modification will have no effect on the hardware portion.

As shown in FIG. 3, the next generation MSC with the above features consists of a high-ranked processor 20 corresponding to the software portion thereof and a switching section 10 corresponding to a hardware portion thereof. A High Message Switch (HMS) 130 is arranged between the high-ranked processor 20 and the switching section 10.

The high-ranked processor 20 can be implemented by a workstation with a plurality of processors 20-1, . . . , 20-n (hereinafter referred to as "WS 20") to share and process the load generated from a plurality of BSC 30-1, . . . , 30-n (hereinafter, referred to as "BSC 30"). Alternatively, if the software portion of the next generation MSC is implemented by a plurality of workstations with its own processor, the workstations are coupled to each other through a Local Area Network (LAN) to perform the mobile call service. The software portion of the next generation MSC is implemented by the plurality of processors 20 to perform the control operation of the processing load allocated thereto.

The switching section 10 includes a high message switch (HMS) 130, a plurality of call processors 150-1, . . . , 150n (hereinafter referred to as "call processor 150") corresponding to the plurality of the BSCs 30 in such a manner that each call processor is coupled to each of the BSCs 30 and the ASPs 140-1, . . . , n 140-n (hereinafter, referred to as "ASP 140").

Figure 5:
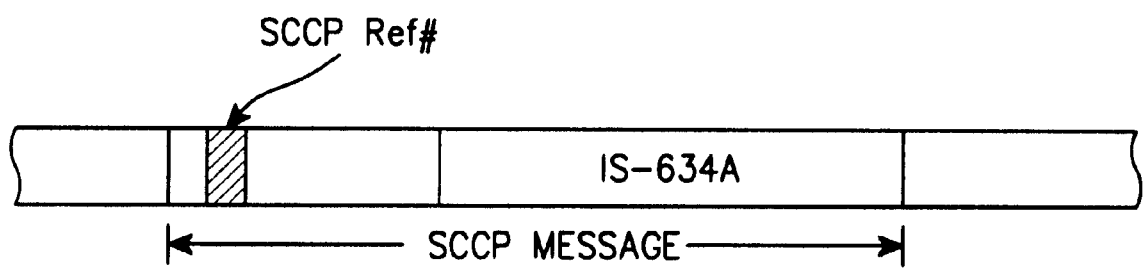
FIG. 5 is a schematic view illustrating the configuration of a message transmitted between a base station and a mobile switching center to implement the embodiment of the present invention.

The switching section 10 receives the BSC control related message from the BSC 30 for application to the high-ranked processor 20, and in turn receives the BSC control request message from the high-ranked processor 20 for application to the corresponding BSC. At this point, a distinct code SCCP Reference # for sorting a specific mobile call is transmitted and received between the switching section 10 and the BSC 30. The distinct code is an intrinsic number that is selected from a series of integers ranging from 0 to 4095. The distinct code is used for designating a specific high-ranked processor. That is, the distinct code is used as an identifier during exchanges between the BSC 30 and the switching section 10, so that the same high-ranked processor can be used for negotiating a protocol between originating and terminating call halves. The distinct code, as shown in FIG. 5, is allocated in a slot of the SCCP message frame, which includes the SCCP Ref # corresponding to the distinct code. Using the distinct code, t he high-ranked software WS 20 consisting of a plurality of independent workstations can share the processing operation of the BS related message generated from the switching section 10.

Figure 6:
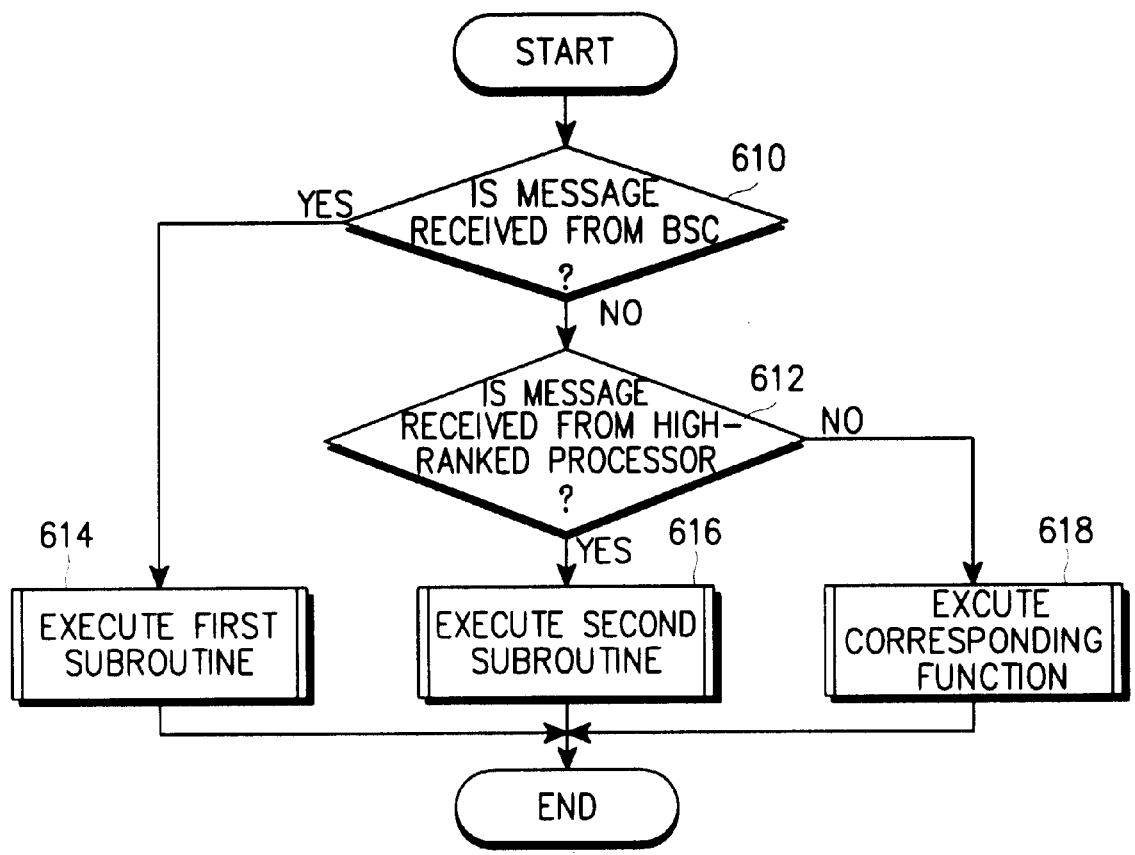
FIG. 6 is a main control routine illustrating the sharing process of a load in a mobile switching center according to the embodiment of the present invention.
Figure 7:
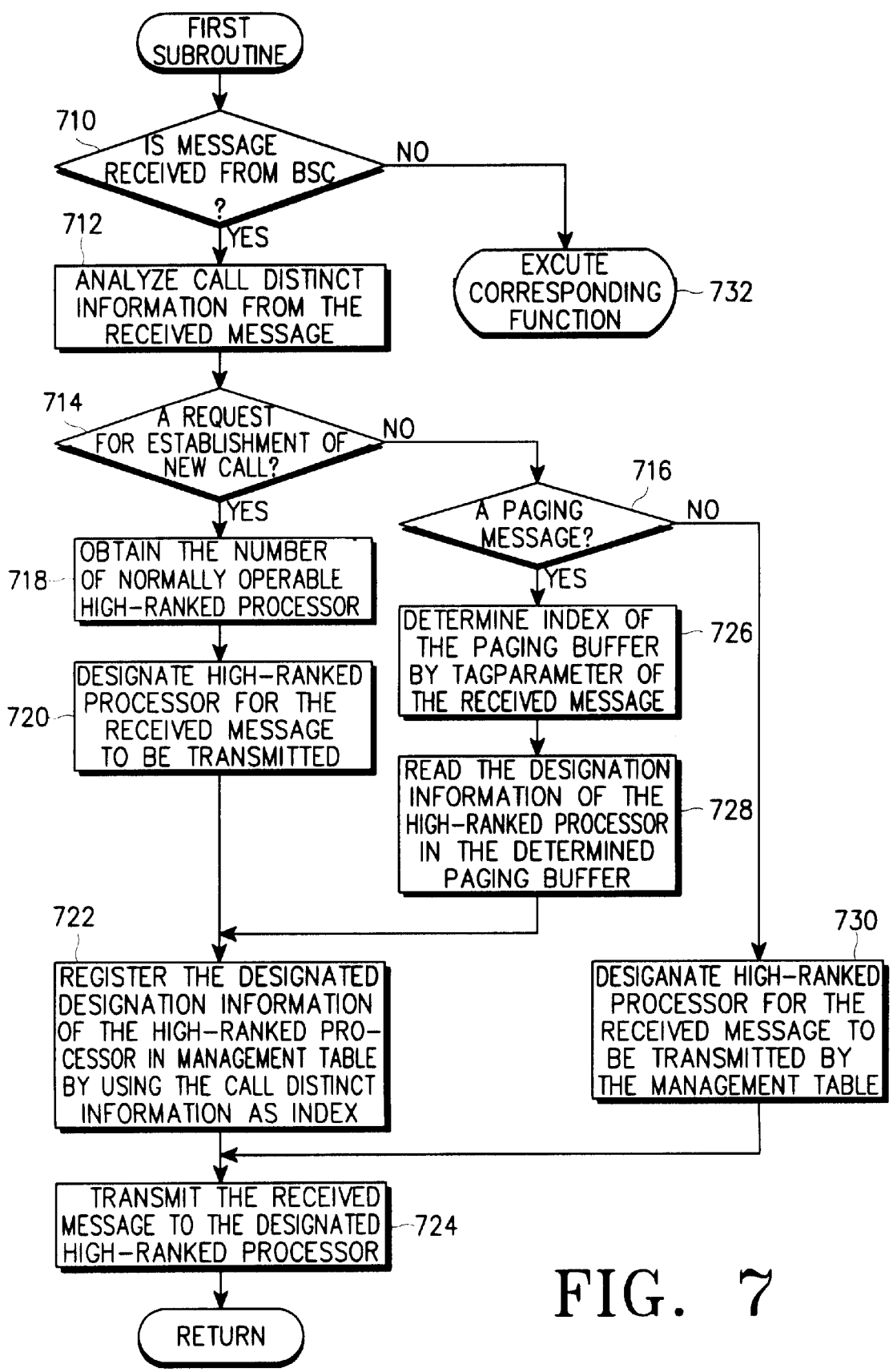
FIG. 7 is a flowchart illustrating the first sub routine of FIG. 6.
Figure 8:
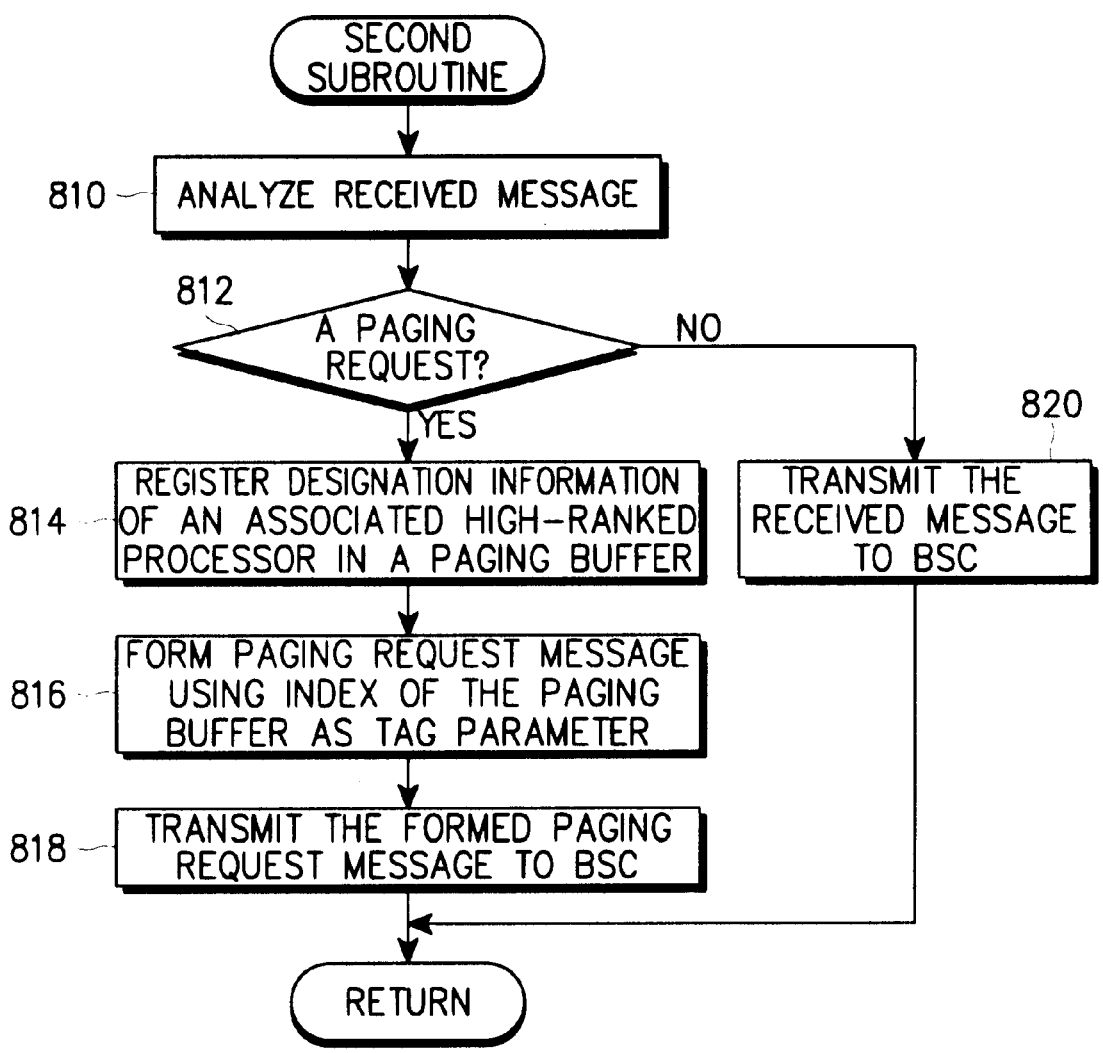
FIG. 8 is a flowchart illustrating the second sub routine of FIG. 6.

FIGS. 6 to 8 illustrate the control routine to be executed by the ASP 140 according to the embodiment of the present invention. FIG. 6 illustrates the main control routine of a real time load-sharing operation to be executed by the ASP 140 of a mobile switching center according to the embodiment of the present invention. FIG. 7 illustrates a flowchart depicting the first sub routine of FIG. 6, and FIG. 8 illustrates a flowchart illustrating the second sub routine of FIG. 6. The control protocol to be executed by the ASP 140 is classified into a control routine for a load sharing process according to the processing of a calling party's half call (or originating call half), and a control routine for the load sharing process according to the processing of a called party's half call (or a terminating call half). The control routine for the originating call half is explained in greater detail in steps from 710 to 724 and step 730 of FIG. 7, and the control routine for the terminating call half is explained in greater detail in steps 716 to 728 of FIG. 7 and in steps 810 to 820 of FIG. 8.

In the embodiment of the present invention, as the same high-ranked process 20 should perform the processing operation of the originating call half and the terminating call half, the switching section 10 must inform the high-ranked processor 20 during a call request mode and a call request response mode. During the originating call half, a specific high-ranked processor 20 is assigned using the distinct code so that the assigned high-ranked processor can perform the call origination processing. On the other hand, during the terminating call half, the switching section 10 temporarily remembers a specific high-ranked processor 20 that has transmitted the paging request message so that, upon receiving the paging request response message from the corresponding BSC, the paging request response message can be sent back to the same high-ranked processor 20 where the paging request message was transmitted.

Figure 9:
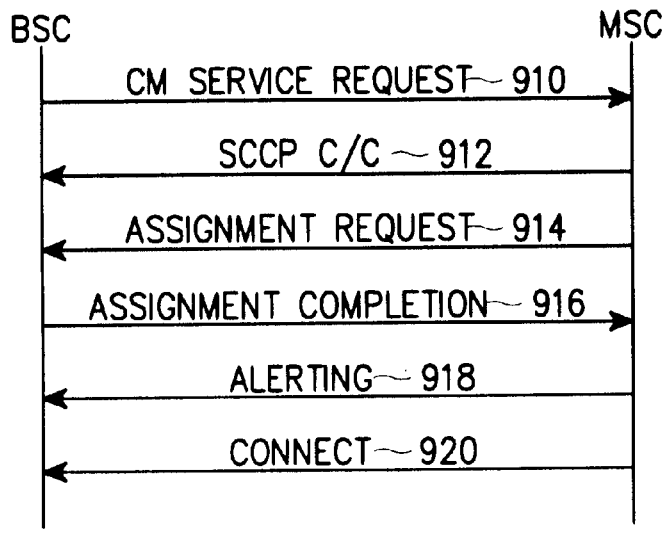
FIGS. 9 and 10 represent the flow of the control signals exchanged between a base station and a mobile switching center according to the embodiment of the present invention.
Figure 10:
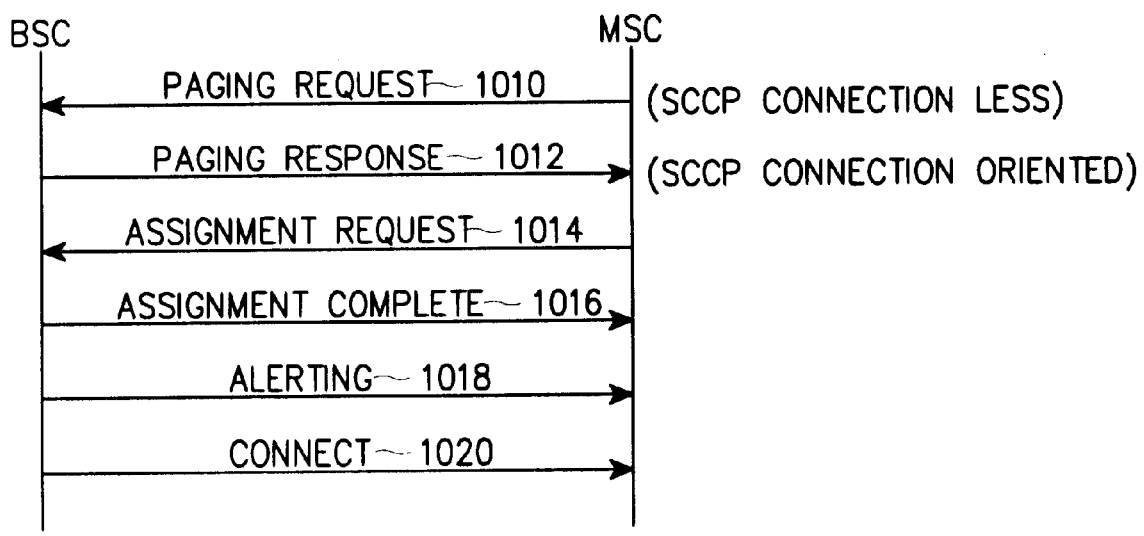

Meanwhile, FIG. 9 illustrates control signal flows between the BSC 30 and the MSC 10 according to the processing of the calling party's half call in accordance with the embodiment of the present invention. FIG. 10 illustrates control signal flows between the BSC 30 and the MSC 10 according to the processing of the called party's half call in accordance with the embodiment of the present invention.

Now, an explanation of the control routine operation according to the preferred embodiment of the present invention will be given in more detail hereinafter with reference to the accompanied drawings.

With reference to FIG. 6, in steps 610 to 612, a plurality of ASPs 140-N constituting the switching section 10 determines whether a message is received from the BSC 30 or WS 20. In step 610, the APS 140 determines whether or not a message is received from the BSC 30. If it is determined in step 610 that the message is received from the BSC 30, the program proceeds to step 614 in which the ASP 140 performs the first sub-routine. If, on the other hand, it is determined in step 610 that the message is not received from the BSC 30, the program proceeds to step 612 where the ASP 140 further determines whether the message is received from the WS 20 constituting the high-ranked processor. If it is determined in step 612 that the message is received from the WS 20, the program proceeds to step 616 where the ASP 140 performs the second sub-routine. On the other hand, if it is determined in step 612 the received message is not from the WS 20, the program proceeds to step 618 where the ASP 140 performs other functions, such as checking the maintenance of the BSC interfaces, measuring the load of the ASP, etc.

The first sub-routine operation to be executed in step 614 according to the reception of a message from the BSC 30 in step 610 will be described in detail hereinafter with reference to the control routine of the calling party's half call, as explained in steps 710 to 724, and step 730 of FIG. 7. In step 710, the ASP 140 determines whether or not a message is received from the BSC 30. If it is determined in step 710 that the message is received from the BSC 30, the program proceeds to step 712 in which the ASP 140 analyzes the call distinction information, SCCP Reference #, from the received message. The received message has the configuration as shown in FIG. 5. It can be seen from the configuration of FIG. 5 that the received message includes a separate region for writing the call distinction information. Therefore, in step 712, an access to the call distinction information written in the designated region of the received message will make it possible to analyze the call distinction information, SCCP Reference #. The call distinction information is a value given for the BSC 30 coupled to the switching section 10 to control a call and is represented by a series of integers ranging from 0 to 4059.

After completion of the analysis of the call distinction information in step 712, the program proceeds to step 714 where the ASP 140 determines whether or not the received message is a calling party's start message, CM Service Request message, for requesting a call connection. If it is determined in step 714 that the received message is the calling party's request message, the ASP 140 performs the calling party's half call processing operation by designating a specific high-ranked processor, which is determined based on the call distinct code received from a predetermined base station controller. Then, the ASP 140 transmits the received originating call message to the designated high-ranked processor in steps 718 to 724. In step 718, the ASP 140 learns the number of currently operable high-ranked processors 20, then the program proceeds to step 720 in which the ASP 140 designates a high-ranked processor 20 where the calling party's request message is transmitted. In designating the high-ranked processor 20 to be executed in step 720, a remainder ID scheme is used. That is, designating a high-ranked processor is achieved by examining the remainder value after dividing the received call distinction information by the number of the high-ranked processors 20 obtained in step 718. For an example, the high-ranked processor is allocated in such a manner that if the remainder value after dividing the call distinction information by the number of the high-ranked processors 20 is "0", the high-ranked processor to be designated is WS 0. If the remainder is "1", the high-ranked processor to be designated is WS 1, and if the remainder is "2", the high-ranked processor to be designated is WS 2, and so forth.

After performing the above-mentioned process in designating the high-ranked processor 20 to which the calling party's request message is to be transmitted, the program proceeds to step 722. In step 722, the ASP 140 registers the designation information including the designated high-ranked processor in a management table using the call distinction information as a reference index, as shown in the table below [Table 1].

TABLE 1

| Call distinction information | Designation Information of High-Ranked Processor |
| --- | --- |
| 0 | WS 0 |
| 1 | WS 1 |
| 2 | WS 2 |
| 3 | WS 3 |
| 4 | WS 4 |
| 5 | WS 5 |
| 6 | WS 6 |
| 7 | WS 7 |
| 8 | WS 0 |
| 9 | WS 1 |
| 4093 | WS 5 |
| 4094 | WS 6 |
| 4095 | WS 7 |

As it can from Table 1, as the designation information of the high-ranked processor is stored in the management table in relation to the call distinction information, a subsequent message is provided with a look-up table by which the call origination request can be processed based on the call distinction information of the call request message.

When the registration of the designation information of the high-ranked processor in the management table is completed in step 722, the program proceeds to step 724 so that the ASP 140 can now transmit the calling party's request message received program proceeds to step 724 so that the high-ranked processor that is designated in step 720.

Meanwhile, in step 714, if it is determined that the received message is not the calling party's request message, the program proceeds to step 716 where the ASP 140 determines whether or not the received message is a paging message. If it is determined at step 716 that the received message is not a paging message, the program proceeds to step 730. Then, the ASP 140 reads the designating information of the high-ranked processor registered in the management table to select the high-ranked processor, to which the received message is to be transmitted according to the call distinction information analyzed in step 712. Then, the program proceeds to step 724 where the ASP 140 transmits the received message to the selected high-ranked processor.

Now, the second sub-routine operation to be executed in step 616 of FIG. 6 will be described in detail hereinafter with reference to the processing of the called party's half call, as shown in steps 716 to 728 of FIG. 7 and steps 810 to 820 of FIG. 8.

In step 810, the ASP 140 analyzes the message received from the high-ranked processor 20, and in step 812, it determines whether the analyzed received corresponds to a paging request. The paging request represents a request for informing that there is an incoming call. At this time, the paging request message does not contain any call distinction information so that the corresponding paging request response message can be transmitted back to the same, high-ranked processor. Thus, another method is implemented according to the embodiment of the present invention.

Accordingly, if it is determined that the received message is a paging request message in step 812, the program proceeds to step 814 in which the ASP 140 registers information from the high-ranked processor that has transmitted the received message in a paging buffer. The paging buffer consists of a plurality of cells for temporarily storing the designation information of the high-ranked processor, and each of the cells includes an inherent address identifier.

Thus, an available cell with its own identifier information is selected for temporarily storing the designation information indicating the identity of the high-ranked processor, For an example, the paging buffer in which the designation information of the high-ranked processor is stored can be expressed temporally, as shown in the table below [Table 2].

TABLE 2

| Index | Designation Information of High-Ranked Processor |
|---|---|
| 0 | WS 4 |
| 1 | WS 0 |
| 2 | WS 6 |
| 3 | WS 2 |

After the completion of the temporally storing the designation information corresponding to a different high-ranked processor in step 814, the program proceeds to step 816 where the ASP 140 forms a paging request message by attaching the address (index) of the cell of the paging buffer. That is, the index number of the cell is attached as a tag parameter for identifying purposes. After completing the formation of the paging request message, the program proceeds to step 818 where the ASP 140 transmits the formed paging request message to a corresponding BSC 30.

When the corresponding BSC 30 receives the paging request message transmitted from the ASP 140, it transmits a paging response message with the cell index tag attached therein to the high-ranked processor 20. Thus, the paging response message includes an address that can be used to identify the high-ranked processor that has initially transmitted the paging request message.

The ASP 140 detects the paging response message transmitted to the high-ranked processor 20 from the BSC 30 in step 716 of FIG. 7. That is, the ASP 140 determines in step 716 whether or not the message received from the BSC 30 is a paging response message. If it is determined in step 716 that the received message is the paging response message, the program proceeds to step 726 where the ASP 140 analyzes the address used as the tag parameter, which is contained in the received paging response message, to the corresponding cell in the paging buffer. After completing the determination of the specific cell of the paging buffer, the program proceeds to step 728 where the ASP 140 obtains information on the high-ranked processor corresponding to the determined cell.

When the above operation retrieves the designation information of the high-ranked processor, the program proceeds to step 722 where the ASP 140 registers the designation information of the high-ranked processor in the management table. After the registration of the designation information in the management table, the program proceeds to step 724 where the ASP 140 transmits the received paging response message to the high-ranked processor corresponding to the registered designation information.

Meanwhile, if it is determined that the analyzed received message is not the paging request in step 810, the program proceeds to step 820, and the ASP 140 transmits the received message to the corresponding BSC 30.

Accordingly, the present invention allows a load to be shared in real time when a new call is generated. If the same high-ranked processor performs the calling party's half call processing operation and the called party's half call processing operation, the low-ranked switching section sends a message to the high-ranked processor. If a high-ranked processor is designated to process an initial mobile call, any response message is provided to the same high-ranked processor until a call connection is established. Moreover, it is possible to transmit a message to a high-ranked processor that has requested a paging operation when there is no call distinction information available to track the paging requesting high-ranked processor.

As described above, the present invention has an advantage in that it provides separate hardware and software modules for an originating call half and a terminating call half and for sharing the load optimally by distributing the load in real time when a call is generated, thereby processing a call more rapidly. Also, the same high-ranked processor continues to process the received message until a corresponding call connection is established, thereby processing the call more reliably.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation according to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. In a telecommunication system comprising a mobile switching center (MSC) connected to a plurality of base station controllers (BSCs), wherein said MSC includes a plurality of work stations having a processor in a first module and a plurality of access switch processors (ASPs) coupled to respective said base station controllers in a second module, a method for processing a call between originating and terminating call halves in said mobile switching center, comprising the steps of:

(a) determining, by an access switch processor (ASP), if a message received therein is transmitted from a base station controller (BSC);

(b) if said received message is transmitted from said BSC, selecting one of said work stations for exchanging control signals between said first module and said second module;

(c) if said received message is not transmitted from said BSC, determining whether said receive message is transmitted from one of said work stations; and, (d) if said received message is transmitted from said one of said work stations, marking a work station identifier with an index number in a tag parameter of said received message and transmitting said message to said BSC;

wherein said step (b) of selecting said work station comprises:

(1) retrieving a call distinct code from said received message from said BSC;

(2) determining whether said received message is a call originating message;

(3) detecting a total number of said work stations within said MSC in service if said received message corresponds to said call originating message;

(4) selecting one of said work stations to transmits said call origination message, said work station is selected according to a remainder value, which is derived by dividing said determined total number of said work stations by said retrieved distinct code;

(5) storing said selected work station corresponding to said call distinct code in a look-up table of said MSC; and (6) transmitting said received message to said selected work station.

2. The method of claim 1, further comprising the step of:

obtaining a work station information corresponding to said retrieved call distinct code from said look-up table if said received message is a paging message; and, transmitting said received message to said work station.

3. The method of claim 1, wherein said call distinct code is selected from a predetermined integer range, said call distinct code corresponds to a predefined mobile station requesting said call origination message.

4. In a telecommunication system comprising a mobile switching center (MSC) connected to a plurality of base station controllers (BSCs), wherein said MSC includes a plurality of work stations having a processor in a first module and a plurality of access switch processors (ASPs) coupled to respective said base station controllers in a second module, a method for processing a call between originating and terminating call halves in said mobile switching center, comprising the steps of:

(a) determining, by an access switch processor (ASP), if a message received therein is transmitted from a base station controller (BSC);

(b) if said received message is transmitted from said BSC, selecting one of said work stations for exchanging control signals between said first module and said second module;

(c) if said received message is not transmitted from said BSC, determining whether said receive message is transmitted from one of said work stations; and, (d) if said received message is transmitted from said one of said work stations, marking a work station identifier with an index number in a tag parameter of said received message and transmitting said message to said BSC;

wherein said step (d) of selecting said work station comprises:

(1) in response to a paging request message from said one of said work stations, storing information of said one of said work stations in a paging buffer of said MSC, said paging buffer includes a predetermined buffer index numbers corresponding to the respective location of said paging buffer;

(2) attaching said buffer index number to a tag field of said paging request message;

(3) transmitting said paging request message having said attached buffer index number in the tag field to said BSC.

5. The method of claim 4, further comprising the steps of:

(4) determining whether said received message from said BSC is a paging request response message responsive to said paging request message;

(5) if said paging request response message is received, retrieving said buffer index number from said paging request response message;

(6) reading a work station information corresponding to said retrieved buffer index number from said paging buffer; and, (7) transmitting said paging request response message according to said read work station information.

6. The method of claim 5, further comprising the step of storing said read work station information in a look-up table of said MSC.

7. The method of claim 4, further comprising the steps of:

retrieving a call distinct code from said received message from said BSC if said received message is not said paging request response message; and, transmitting said received message to said work station corresponding to said retrieved call distinct code.

8. The method of claim 4, wherein said call distinct code is selected from a predetermined integer range, said call distinct code corresponds to a predefined mobile station requesting said call origination message.

* * * * *